US011889594B2

(12) United States Patent
Gaertner et al.

(10) Patent No.: US 11,889,594 B2
(45) Date of Patent: Jan. 30, 2024

(54) ELECTRONIC SYSTEM FOR DRIVING LIGHT SOURCES AND METHOD OF DRIVING LIGHT SOURCES

(71) Applicants: STMicroelectronics (Grenoble 2) SAS, Grenoble (FR); STMicroelectronics S.r.l., Agrate Brianza (IT); STMicroelectronics Application GMBH, Aschheim-Dornach (DE)

(72) Inventors: Manuel Gaertner, Feldkirchen (DE); Philippe Sirito-Olivier, St Egreve (FR); Giovanni Luca Torrisi, Catania (IT); Thomas Urbitsch, Lumbin (FR); Christophe Roussel, Claix (FR); Fritz Burkhardt, Munich (DE)

(73) Assignees: STMicroelectronics (Grenoble 2) SAS, Grenoble (FR); STMicroelectronics S.r.l., Agrate Brianza (IT); STMicroelectronics Application GMBH, Aschheim-Dornach (DE)

( * ) Notice: Subject to any disclaimer, the term of this patent is extended or adjusted under 35 U.S.C. 154(b) by 0 days.

(21) Appl. No.: 17/654,532

(22) Filed: Mar. 11, 2022

(65) Prior Publication Data

US 2022/0312566 A1 Sep. 29, 2022

(30) Foreign Application Priority Data

Mar. 26, 2021 (IT) ........................ 102021000007490

(51) Int. Cl.
*H05B 45/14* (2020.01)
*H05B 45/46* (2020.01)
(Continued)

(52) U.S. Cl.
CPC ............. *H05B 45/46* (2020.01); *H05B 45/14* (2020.01); *H05B 45/325* (2020.01); *H05B 45/50* (2020.01)

(58) Field of Classification Search
CPC ........ H05B 45/10; H05B 45/14; H05B 45/30; H05B 45/325; H05B 45/46; H05B 45/50; H05B 47/10
See application file for complete search history.

(56) References Cited

U.S. PATENT DOCUMENTS 6,943,504 B1 9/2005 York
2011/0291634 A1 12/2011 Takata et al.
(Continued)

FOREIGN PATENT DOCUMENTS

CN 102239745 A * 11/2011 ......... H05B 33/0815
DE 102011079473 A1 1/2013
(Continued)

*Primary Examiner* — Jimmy T Vu
(74) *Attorney, Agent, or Firm* — Slater Matsil, LLP

(57) ABSTRACT

A system includes lighting devices coupled to output supply pins, a microcontroller circuit, and a driver circuit, which receives data therefrom, and switches coupled in series to the lighting devices. The driver circuit includes output supply pins and selectively propagates a supply voltage to the output supply pins to provide respective pulse-width modulated supply signals at the output supply pins. The driver circuit computes duty-cycle values of the pulse-width modulated supply signals as a function of the data received from the microcontroller circuit. The lighting devices include at least one subset coupled to the same output supply pin. The microcontroller individually controls the switches via respective control signals to individually adjust a brightness of the lighting devices in the at least one subset of lighting devices.

20 Claims, 6 Drawing Sheets

(51) Int. Cl.
*H05B 45/50* (2022.01)
*H05B 45/325* (2020.01)

(56) References Cited

U.S. PATENT DOCUMENTS

| | | | |
|---|---|---|---|
| 2012/0181931 | A1 | 7/2012 | Katsura |
| 2013/0082602 | A1 | 4/2013 | Bradford |
| 2019/0306941 | A1 | 10/2019 | Gaertner et al. |
| 2020/0094730 | A1 | 3/2020 | Yasuda |

FOREIGN PATENT DOCUMENTS

| | | | | |
|---|---|---|---|---|
| DE | 102017125173 | A1 | 5/2019 | |
| EP | 2958402 | A1 * | 12/2015 | ......... H05B 33/0827 |

* cited by examiner

- PRIOR ART -

- PRIOR ART -

ELECTRONIC SYSTEM FOR DRIVING LIGHT SOURCES AND METHOD OF DRIVING LIGHT SOURCES

CROSS-REFERENCE TO RELATED APPLICATIONS

This application claims priority to Italian Patent Application No. 102021000007490, filed on Mar. 26, 2021, which application is hereby incorporated by reference herein in its entirety.

TECHNICAL FIELD

The present disclosure generally relates to driving light sources and, in particular embodiments, to a driving light sources comprising Light-Emitting Diodes (LEDs).

BACKGROUND

As is known, LEDs are increasingly used in lighting devices (e.g., lamps) in an increasing number of fields due to their advantageous characteristics as to cost, dimensions, duration, directionality, and electrical efficiency.

LED-based lighting devices are used both stand-alone and included in more complex systems. In the latter case, often, a controller is configured to manage the operation of a number of different loads. For example, in the automotive field, control of the switching of the LEDs and their functionality is generally included in a system. The system may include a microcontroller and at least one driver circuit formed in different chips for controlling a number of functions, such as mirror adjustment, lock control, direction indicator, and various lighting functions. The driver circuit may be provided, for instance, as an application-specific standard product (ASSP).

The devices available with the companies of the STMicroelectronics group under the trade designations L99DZ100G and L99DZ100GP, as described in the datasheet "DS11546 Rev 5" (March 2019) available at st.com, are exemplary of such driver circuits configured to control various functions in a certain zone of a vehicle (e.g., zone controllers such as "door modules"), including one or more lighting functions. The device available with the companies of the STMicroelectronics group under the trade designation L99DZ120, as described in the datasheet "DS11567 Rev 5" (March 2019) available at st.com, is also exemplary of a driver circuit configured to control various functions in a certain zone of a vehicle (e.g., a zone controller such as a "door module"), including one or more lighting functions.

Such known devices may implement a programmable brightness compensation of the light sources driven thereby, as disclosed, for instance, in U.S. Pat. No. 10,375,774 B2 assigned to companies of the STMicroelectronics group. It may be desired to maintain a constant light brightness when the LED elements are on. The brightness of the LEDs depends on a number of parameters, including the actual supply voltage level. However, particular to automotive applications, the supply voltage is generally not constant: numerous voltage transients may occur on the supply voltage $V_{BAT}$, both negative and positive caused, for example, by the start of a vehicle engine, which may cause a drop of the supply voltage $V_{BAT}$ even down to half of its nominal value (e.g., from 12 V to 6 V), or switching on/off of heavy inductive loads, such as window opening motors. Therefore, in case of varying or unstable supply voltage, the brightness of the LEDs may not be constant, and flickering may occur, which is an undesired effect.

To mitigate the above-discussed issue, document U.S. Pat. No. 10,375,774 B2 discloses an electrical load control system intended for, for example, automotive application, as illustrated in FIG. 1 annexed herein. The electrical load control system moo includes a driver circuit 101, a microcontroller 102, a number n of LED groups 311 to 3*m*. (e.g., LED strings), and possibly other loads, such as mirror adjustment motors, lock control motors, direction indicators, and other lighting elements (not visible in FIG. 1).

The microcontroller 102 has a plurality of controller I/O pins 102A coupled, via a number of respective connection lines 105 (e.g., implemented by a Serial Peripheral Interface bus), to the driver circuit mom. The driver circuit 101 includes a brightness control device 20, a logic and diagnostic circuit 106, a driver circuit 29, and optionally other driver circuits (not visible in FIG. 1).

The driver circuit 101, thus, has a first plurality of I/O pins 101A coupled to the connection lines 105, the logic and diagnostic circuit 106 and the brightness control device 20, a second plurality of I/O pins (not visible in FIG. 1) coupled to the other loads, and a third plurality of I/O pins 101$C_1$ to 101$C_n$ coupled to the driver circuit 29 and the plurality of LED groups 31$_1$ to 31$_n$.

Optionally, a current-setting or current-limiting element (e.g., a resistor) may be coupled in series to each LED group 31.

The brightness control device 20 includes a processing circuit 21 (e.g., a state machine implemented as hardwired logic), a first register circuit 22 for storing values (e.g., a number n of values) of the nominal duty-cycle DCN of the supply signal to be applied to each LED group 31, a second register circuit 23 for storing values (e.g., a number n of values) of the LED forward voltage $V_{LED}$ of each LED group 31, a third register circuit 24 for storing values (e.g., a number n of values) of a compensated duty-cycle $DC_C$ of the supply signal to be applied to each LED group 31, and an ADC converter 25 for providing (e.g., acquiring) a digital value $V_S$ of an actual supply voltage $V_{BAT}$ received from a power supply source such as a battery.

The processing circuit 21, which implements an algorithm for brightness control, may be the same element as the logic and diagnostic circuit 106. The brightness control device 20 operates as described in the following.

In a setting phase, the registers in the first register circuit 22 are loaded with the nominal duty-cycle value $DC_{N\_i}$ for each of the n LED groups 31, and the registers in the second register circuit 23 are loaded with the LED forward voltage $V_{LED\_i}$ for each of the n LED groups 31 (these values being received, for instance, from the microcontroller 102 via the connection lines 105, depending on the desired lighting function to be implemented).

In addition, the registers in the second register circuit 23 may be loaded with a (single) activation bit for each of the LED groups 31, whose value determines whether voltage compensation is to be applied to the respective duty-cycle value. A nominal supply voltage $V_{TH}$ (e.g., equal to 10 V) is also stored in the brightness control device 20.

In operation, at each compensation cycle, initially, the processing circuit 21 reads the digital value $V_S$ of the actual supply voltage at the output of the ADC converter 25. Then, a LED group counter i is initialized to 1. The processing circuit 21 checks whether adjusting is set for the specific i-th LED group 31 by reading the content of the relevant adjustment activation bit in the corresponding register in the second register circuit 23.

In the affirmative case, the nominal duty-cycle $DC_{N\_i}$ and LED forward voltage $V_{LED\_i}$ in the first and second register circuits 22, 23 for the respective LED group $\mathbf{31}_i$ are read, and the present, compensated duty-cycle $DC_{C\_i}$ for the i-th LED group is calculated in the processing circuit 21 using the equation below, and then stored in the respective register of the third register circuit 24:

$$DC_C = \frac{V_{TH} - V_{LED}}{V_S - V_{LED}} \cdot DC_N$$

If no adjusting is set for the specific i-th LED group 31, the present duty-cycle $DC_{C\_i}$ is set to be the nominal duty-cycle $DC_{N\_i}$.

Then, in both cases, the LED group counter i is incremented, and it is verified whether the present duty-cycle $DC_{C\_i}$ has been determined for each LED group 31.

In the negative case, the processing circuit 21 checks whether adjusting is set for the subsequent LED group 31; in the affirmative case, the processing circuit 21 is ready for starting a new compensation cycle.

The values of the present (compensated) duty-cycle $DC_{C\_i}$ loaded in the registers of the third register circuit 24 are then used for driving the LED groups 31 using the driver elements (e.g., high-side driver transistors) $\mathbf{30}_1$ to $\mathbf{30}_n$, which propagate the supply voltage $V_{BAT}$ to the respective I/O pins $\mathbf{101}C_1$ to $\mathbf{101}C_n$ modulated as a function of the respective duty-cycle values $DC_{C\_i}$ read from the third register circuit 24 (e.g., with a Pulse Width Modulation, PWM) and thus provide respective PWM supply signals $V_{BAT,1}$ to $V_{BAT,n}$.

Due to the increasing complexity of LED lighting systems (in particular in automotive applications), the number of LED groups 31 driven by the system 100 may be higher than the number n of I/O pins 101C of the driver circuit 101 (in general, the number n of I/O pins 101C being equal to the number of registers in each of the first, second and third register circuits 22, 23, 24 as well as equal to the number of driver elements 30 provided in the driver circuit 29). In such a case, plural LED groups 31 may be coupled in parallel to the same I/O pin 101C of the driver circuit 101, as exemplified in FIG. 2.

For example, a number m of LED groups $\mathbf{31}_{1,1}$, $\mathbf{31}_{1,2}$, . . . , $\mathbf{31}_{1,m}$ may be coupled in parallel to the same I/O pin $\mathbf{101}C_1$ to be controlled by the same driver element $\mathbf{30}_1$ and receive the same PWM supply signal $V_{BAT,1}$.

The same may also apply to other I/O pins 101C with, for example, a certain number of LED groups 31 coupled in parallel to each I/O pin 101C, possibly with a different number of LED groups coupled in parallel to each I/O pin 101C.

In a control system as illustrated in FIG. 2, all the LED groups 31 coupled in parallel to the same I/O pin 101C are driven by the same driver element 30 and are thus driven as a function of the same duty-cycle value (possibly compensated against the variations of the supply voltage $V_{BAT}$ as discussed above) as programmed by the microcontroller 102 via the (e.g., SPI) connection lines 105. As a result, all the LED groups arranged in parallel and coupled to the same I/O pin 101C exhibit the same brightness. The control system does not allow to individually control each LED group 31 (e.g., separately controlling the brightness of the LED groups $\mathbf{31}_{1,1}$ to $\mathbf{31}_{1,m}$).

Therefore, there is a need in the art to provide improved control systems for lighting loads (e.g., LED groups) which facilitate controlling individually a plurality of lighting loads while retaining the possibility of compensating the duty-cycle against the variations of the supply voltage in a centralized manner.

SUMMARY

An object of one or more embodiments is an improved control system for lighting loads. One or more embodiments may relate to a method of driving lighting devices.

In one or more embodiments, a system may include a microcontroller circuit and a driver circuit coupled to the microcontroller circuit to receive data therefrom. The driver circuit may include a plurality of output supply pins and may be configured to selectively propagate a supply voltage to the output supply pins to provide respective pulse-width modulated supply signals at the output supply pins.

The driver circuit may be configured to compute respective duty-cycle values of the pulse-width modulated supply signals as a function of the data received from the microcontroller circuit.

The system may further include a plurality of lighting devices coupled to the plurality of output supply pins. The plurality of lighting devices may include at least one subset of lighting devices coupled to the same output supply pin in the plurality of output supply pins.

The system may further include a set of respective electronic switches coupled in series to the lighting devices in at least one subset of lighting devices.

The microcontroller circuit may be configured to individually control the electronic switches via respective control signals to individually adjust a brightness of the lighting devices in the at least one subset of lighting devices.

One or more embodiments may thus facilitate individually controlling the brightness of a plurality of lighting loads supplied by the same pulse-width modulated supply signal.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise.

Variations or modifications described to one of the embodiments may also apply to other embodiments. Further, it should be understood that various changes, substitutions, and alterations can be made herein without departing from the spirit and scope of this disclosure as defined by the appended claims.

In the ensuing description, one or more specific details are illustrated, aimed at providing an in-depth understanding of examples of embodiments of this description. The embodiments may be obtained without one or more of the specific details or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The headings/references used herein are provided merely for convenience and hence do not define the extent of protection or the scope of the embodiments.

Throughout the figures annexed herein, unless the context indicates otherwise, like pails or elements are indicated with like references/numerals and a corresponding description will not be repeated for brevity.

One or more embodiments may relate to an improved control system for lighting loads (e.g., LED groups), which facilitates individually controlling a plurality of lighting loads while retaining the possibility of compensating the duty-cycle against the variations of the supply voltage in a centralized manner.

Figure 1:
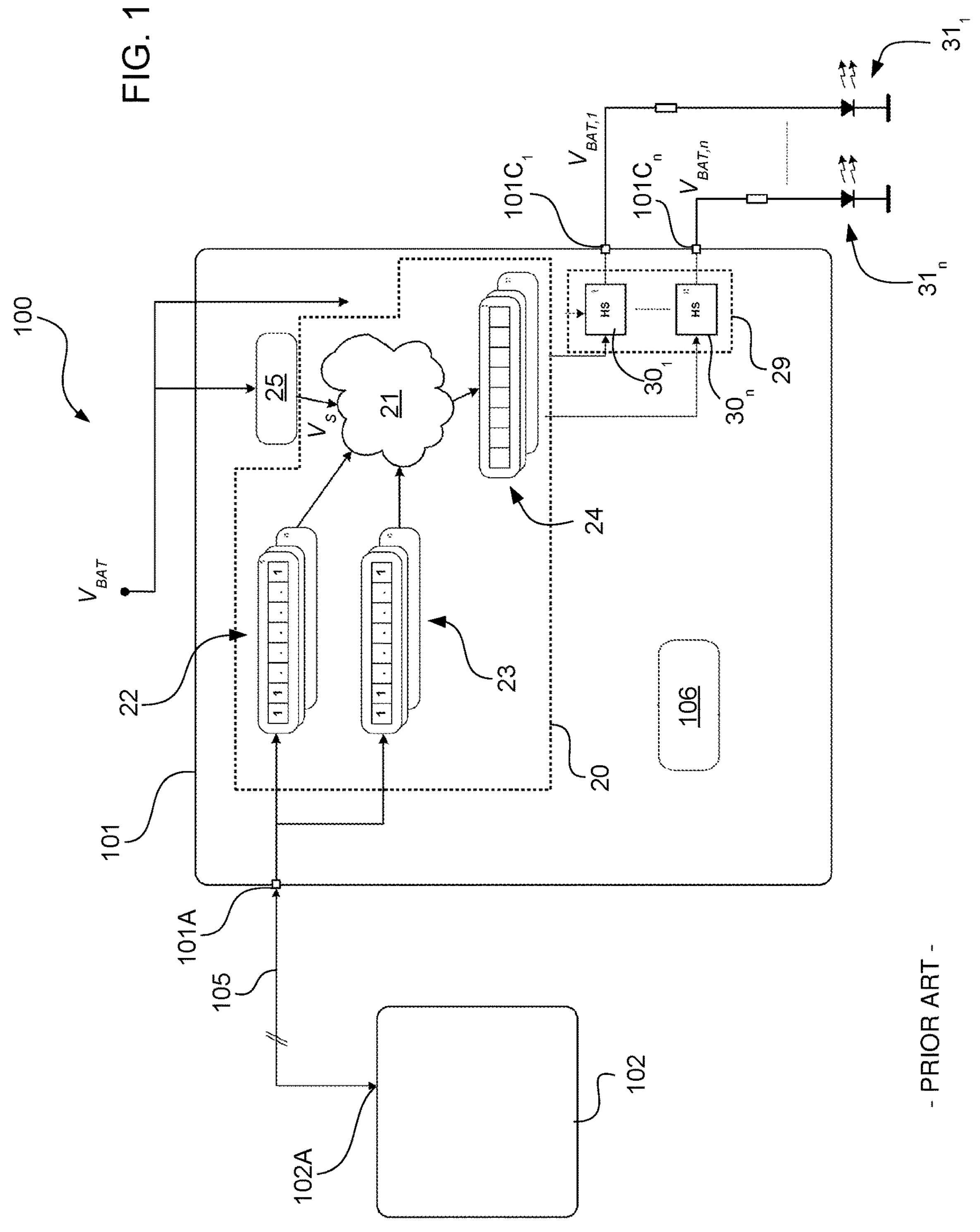
FIG. 1 is a block diagram of a control system for lighting loads.
Figure 2:
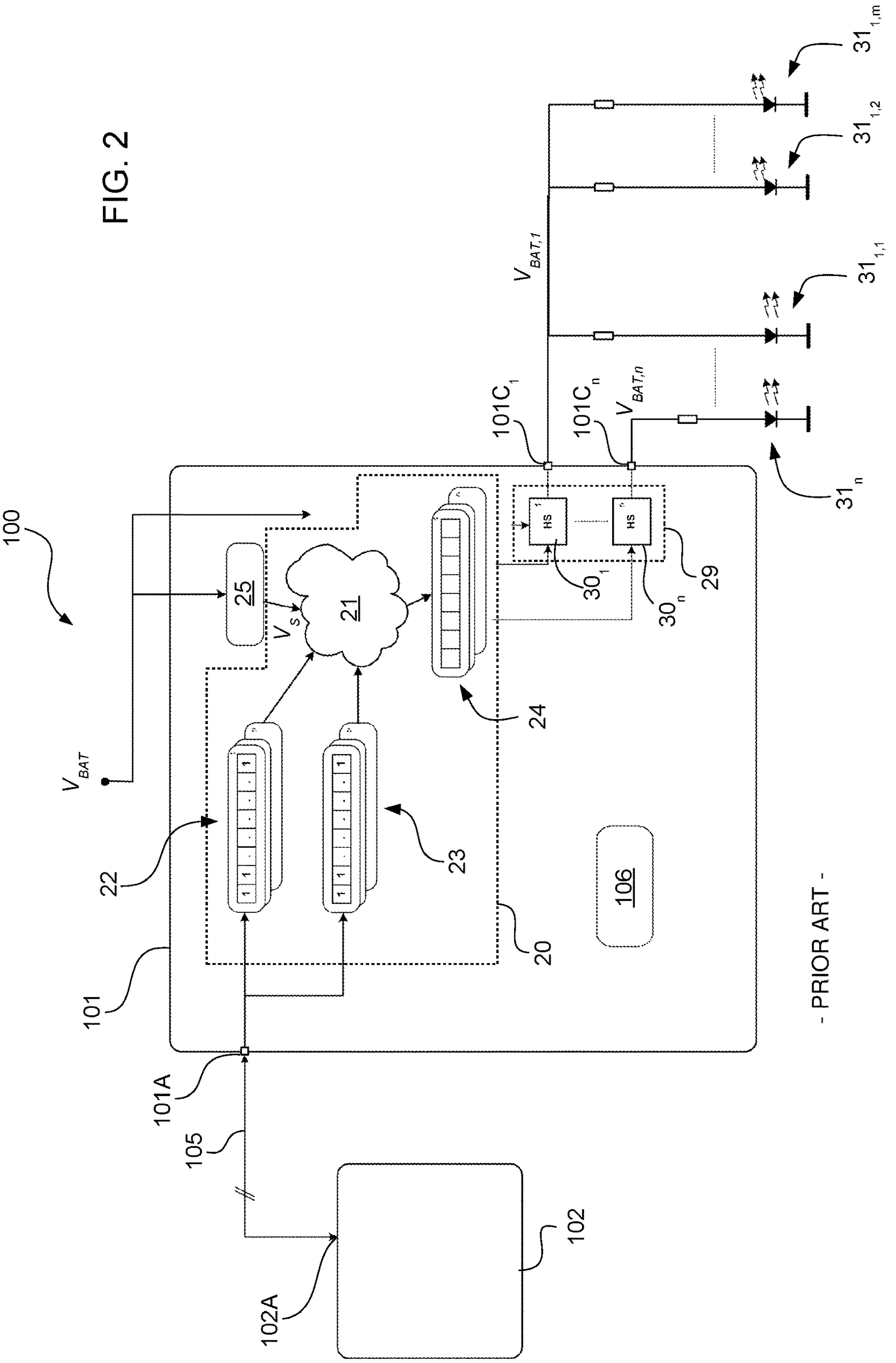
FIG. 2 is a block diagram of another control system for lighting loads.

With reference again to FIGS. 1 and 2, it has been noted that, if the number of lighting devices (e.g., LED groups 31) to be driven by a controller device 101 is higher than the number n of I/O pins 101C of the controller device (also referred to as the number of "channels" of the controller device in the present description), plural lighting devices (e.g., $\mathbf{31}_{1,1}$ to $\mathbf{31}_{1,m}$) may be coupled in parallel to a same I/O pin 101C, with the disadvantage of losing the possibility of controlling individually each lighting device 31, e.g., individually controlling the brightness thereof.

A first straightforward solution to this issue would entail adapting the driver circuit 101 by increasing the number of available I/O pins 101C. However, this solution requires re-designing the whole driver circuit 101. It would increase cost insofar as increasing the number of channels also requires increasing the number of registers in the first, second, and third register circuits 22, 23, and 24, and increasing the number of driver elements 30. In addition, such a solution may be impractical since the number of I/O pins of the driver circuit 101 may generally be limited by the size or type of package of the integrated circuit 101 (e.g., an LQFP-64 package).

Figure 3:
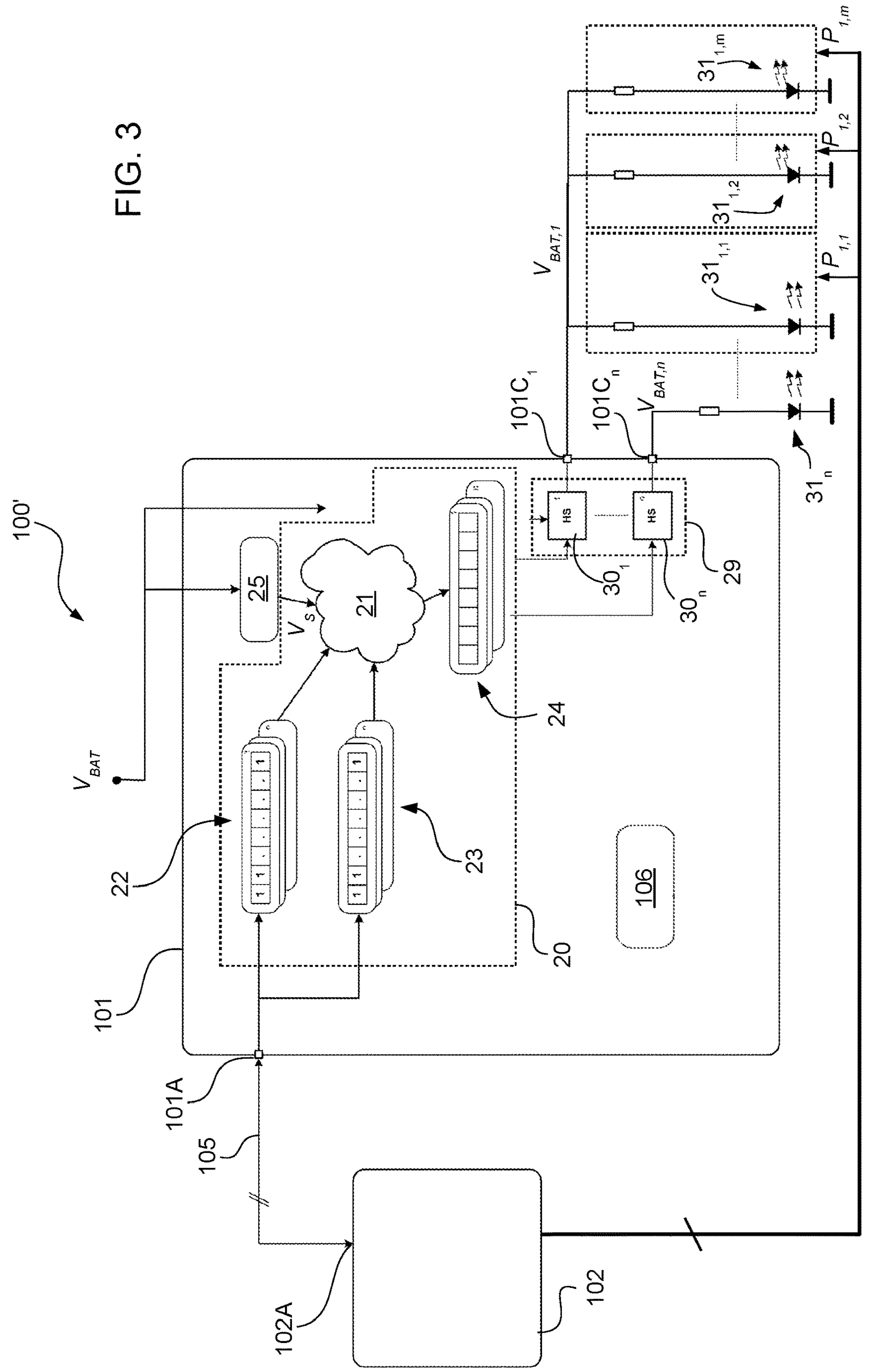
FIG. 3 is a block diagram of an embodiment control system for lighting loads.

Therefore, one or more embodiments, as exemplified in FIG. 3, may rely on a different approach, where the microcontroller 102 is configured to provide a respective duty-cycle control signal (e.g., signals $P_{1,1}$ to $P_{1,m}$) to each of the lighting devices (e.g., LED groups $\mathbf{31}_{1,1}$ to $\mathbf{31}_{1,m}$) coupled in parallel to a same I/O pin (e.g., $\mathbf{101}C_1$).

The duty-cycle control signals $P_{1,1}$ to $P_{1,m}$ may be generated by the microcontroller 102 based on a software programmed in the microcontroller itself.

For instance, the duty-cycle control signals $P_{1,1}$ to $P_{1,m}$ may be pulse-width modulated (PWM) signals having a frequency higher than the frequency of the PWM supply signals $V_{BAT,1}$ to $V_{BAT,n}$ provided by the driver circuit 101 at the I/O pins $\mathbf{101}C_1$ to $\mathbf{101}C_n$.

Purely by way of non-limiting example, the frequency of the duty-cycle control PWM signals $P_{1,1}$ to $P_{1,m}$ may be 10 to 20 times higher than the frequency of the PWM supply signals provided at the I/O pins 101C. For instance, the frequency of the PWM supply signals $V_{BAT,1}$ to $V_{BAT,n}$ may be in the range of 100 Hz to 1 kHz, and the frequency of the duty-cycle control PWM signals $P_{1,1}$ to $P_{1,m}$ may be in the range of 2 kHz to 10 kHz.

Therefore, in one or more embodiments of a lighting load control system 100' as exemplified in FIG. 3, a driver circuit 101 may comprise a plurality of I/O pins $\mathbf{101}C_1$ to $\mathbf{101}C_n$ which provide respective PWM supply signals $V_{BAT,1}$ to $V_{BAT,n}$ whose duty-cycle may be compensated against variations of the supply voltage $V_{BAT}$ using a brightness control device 20, where several lighting loads (LED groups) can be connected in parallel to each of the I/O pins 101C. Additionally, the microcontroller 102 may provide respective independent brightness-setting signals (or duty-cycle control PWM signals) $P_{1,1}$ to $P_{1,m}$ to each lighting load supplied by the same PWM supply signal $V_{BAT,1}$.

Figure 4:
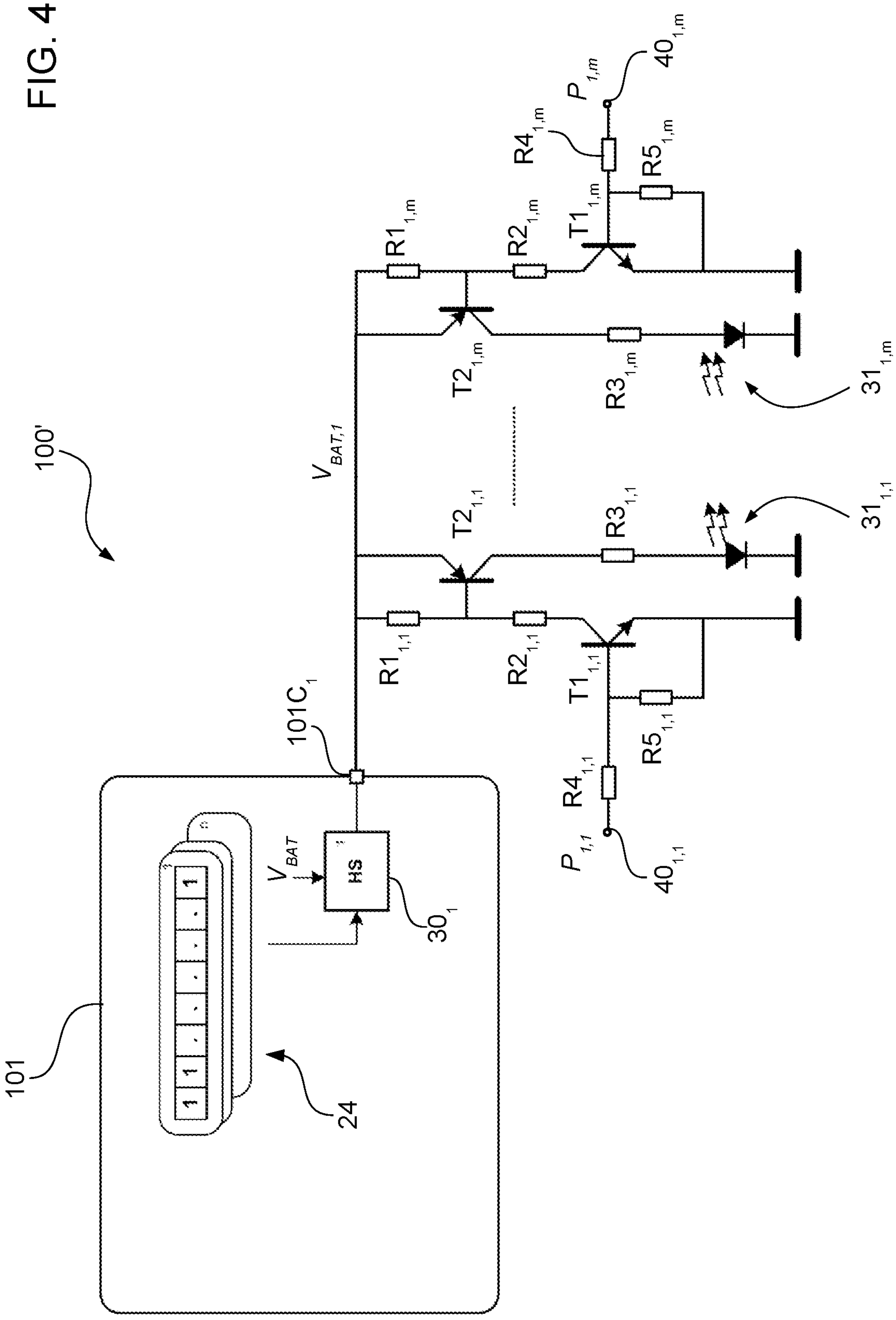
FIG. 4 is a block diagram of an embodiment control system for lighting loads.

In one or more embodiments, each brightness-setting signal $P_{1,1}$ to $P_{1,m}$ may be propagated to the respective LED group $\mathbf{31}_{1,1}$ to $\mathbf{31}_{1,m}$ via additional circuitry as exemplified in FIG. 4, which is exemplary of certain implementation details of a control system 100' as exemplified in FIG. 3.

For the sake of brevity and ease of illustration only, FIG. 4 shows only one I/O pin $\mathbf{101}C_1$ of the driver circuit 101, and only two LED groups $\mathbf{31}_{1,1}$ and $\mathbf{31}_{1,m}$ coupled thereto. However, the person skilled in the art will understand that a similar circuit arrangement may be provided at any LED group 31, which is coupled in parallel to another LED group and which is configured to receive a respective individual brightness-setting signal P.

Also, in FIG. 4 only certain components of the driver circuit 101 are illustrated, again for the ease of illustration only.

As exemplified in FIG. 4, a number of discrete components may be used to propagate (e.g., overlay) a brightness-setting signal P to a corresponding LED group 31 to set its individual duty-cycle.

For instance, the brightness-setting circuitry for LED group $\mathbf{31}_{1,1}$ coupled to the I/O pin $\mathbf{101}C_1$ may comprise: an input pin $\mathbf{40}_{1,1}$ configured to receive the brightness-setting signal $P_{1,1}$, a first current path between the I/O pin $\mathbf{101}C_1$ and ground, the first current path comprising a series arrangement of a first resistor $R\mathbf{1}_{1,1}$, a second resistor $R\mathbf{2}_{1,1}$, and a first transistor $T\mathbf{1}_{1,1}$ having its current path coupled between the second resistor $R\mathbf{2}_{1,1}$ and ground; a second current path between the I/O pin $\mathbf{101}C_1$ and ground, the second current path comprising a series arrangement of a second transistor $T\mathbf{2}_{1,1}$, a third resistor $R\mathbf{3}_{1,1}$, and one or more LEDs $\mathbf{31}_{1,1}$ coupled in series between the third resistor $R\mathbf{3}_{1,1}$ and ground.

As exemplified in FIG. 4, the input pin $\mathbf{40}_{1,1}$ may be coupled to a control terminal of the first transistor $T\mathbf{1}_{1,1}$ to propagate thereto the brightness-setting PWM signal $P_{1,1}$. For instance, the circuitry may comprise a fourth resistor $R4_{1,1}$ coupled between the input pin $\mathbf{40}_{1,1}$ and the control terminal of the first transistor $T\mathbf{1}_{1,1}$, and a fifth resistor $R\mathbf{5}_{1,1}$ coupled between the control terminal of the first transistor $T\mathbf{1}_{1,1}$ and ground.

As exemplified in FIG. 4, the control terminal of the second transistor $T\mathbf{2}_{1,1}$ may be coupled to a node intermediate the first resistor $R\mathbf{1}_{1,1}$ and the second resistor $R\mathbf{2}_{1,1}$.

As exemplified in FIG. 4, the first transistor $T\mathbf{1}_{1,1}$ may be a BJT transistor of the npn type having a base terminal coupled to the input pin $\mathbf{40}_{1,1}$, a collector terminal coupled to the second resistor $R\mathbf{2}_{1,1}$, and an emitter terminal coupled to ground. However, those of skill in the art will understand that alternative embodiments may instead comprise, for instance, a MOS transistor of the n-channel type having a gate terminal coupled to the input pin $\mathbf{40}_{1,1}$, a drain terminal coupled to the second resistor $R\mathbf{2}_{1,1}$, and a source terminal coupled to ground.

As exemplified in FIG. 4, the second transistor $T\mathbf{2}_{1,1}$ may be a BJT transistor of the pnp type having a base terminal coupled to the node intermediate the first resistor $R\mathbf{1}_{1,1}$ and the second resistor $R\mathbf{2}_{1,1}$, a collector terminal coupled to the third resistor $R\mathbf{3}_{1,1}$, and an emitter terminal coupled to the I/O pin $\mathbf{101}C_1$. However, those of skill in the art will understand that alternative embodiments may instead comprise, for instance, a MOS transistor of the p-channel type having a gate terminal coupled to the node intermediate the first resistor $R\mathbf{1}_{1,1}$ and the second resistor $R\mathbf{2}_{1,1}$, a drain terminal coupled to the third resistor $R\mathbf{3}_{1,1}$, and a source terminal coupled to the I/O pin $\mathbf{101}C_1$.

Those of skill in the art will understand that the circuitry illustrated in FIG. 4 is just an example of a possible arrangement that allows further modulating, at a higher frequency, the PWM supply signals received at the LED groups 31 from the I/O pins 101C.

Generally, when the PWM supply signal received from a certain I/O pin 101C is low, the corresponding LED groups 31 are not supplied with current and therefore are off (independently from the value of the brightness-setting signals P).

When the PWM supply signal received from a certain I/O pin 101C is high, the corresponding LED groups 31 can be supplied with current (i.e., turned on), however, the value of the corresponding brightness-setting signal P will determine whether the respective LED group is actually turned on or not. For instance, if P is high, the transistor T1 will be conductive, thus resulting in the transistor T2 being conductive, and therefore turning on the respective LED group 31.

If P is low, instead, the transistor T1 will be non-conductive, thus resulting in the transistor T2 being non-conductive and therefore turning off the respective LED group 31. Since the frequency of the brightness-setting signal P is higher than the frequency of the PWM supply signal received from the I/O pin 101C, the respective LED group 31 can be turned on and off several times during a single "on" time of the PWM supply signal $V_{BAT,1}$, thereby adjusting its brightness.

Therefore, those of skill in the art will understand that one or more embodiments may generally comprise a plurality of LED groups $\mathbf{31}_{1,1}$ to $\mathbf{31}_{1,m}$ coupled in parallel to the same I/O pin $\mathbf{101}C_1$ of the driver circuit 101, and an electronic switch coupled in series to each LED group, which allows selectively coupling and decoupling the LED groups to and from the I/O supply pin 101C as a function of respective brightness-setting signals P received from the microcontroller 102.

In one or more embodiments, the logic and diagnostic circuit 106 of the driver circuit 101 may be additionally configured to carry out a diagnosis procedure, for instance, as a state machine running in the diagnostic circuit. The diagnosis procedure may detect failures (e.g., an unexpected short circuit condition or an overcurrent) in the lighting loads coupled in parallel to the same I/O pin 101C and supplied by the same output, considering the two PWM signals (at high frequency and low frequency) applied to the lighting loads.

It is noted that, because of parasitic capacitances on the printed circuit board, a peak of current is usually delivered by the driver element 30 when a lighting load 31 is turned on. In one or more embodiments, the diagnosis procedure may discriminate such repetitive current peaks from current peaks due to a short to ground of one leg or on pin 101C. The diagnosis procedure may thus facilitate protecting the driver circuit 101, possibly reporting the detected failures to the microcontroller 102.

For instance, the diagnosis procedure may comprise, during each "on" time of the PWM supply signal supplied to an I/O pin 101C, checking (e.g., using a current comparator) whether the current supplied to the I/O pin 101C is higher than a certain threshold. In the affirmative case, an "overcurrent event" flag may be set to indicate that an overcurrent event was detected. Upon expiry of the current "on" time of the PWM supply signal, the overcurrent detection procedure may be disabled.

In one or more embodiments, the overcurrent detection procedure may be enabled during several (subsequent) "on" times of the PWM supply signal, and detected overcurrent events may be reported (only) after several "on" times of the PWM supply signal.

Optionally, the diagnosis procedure may comprise waiting a blanking time at each start of a new PWM period of the PWM supply signal supplied to an I/O pin 101C before enabling the overcurrent detection mechanism.

Figure 5:
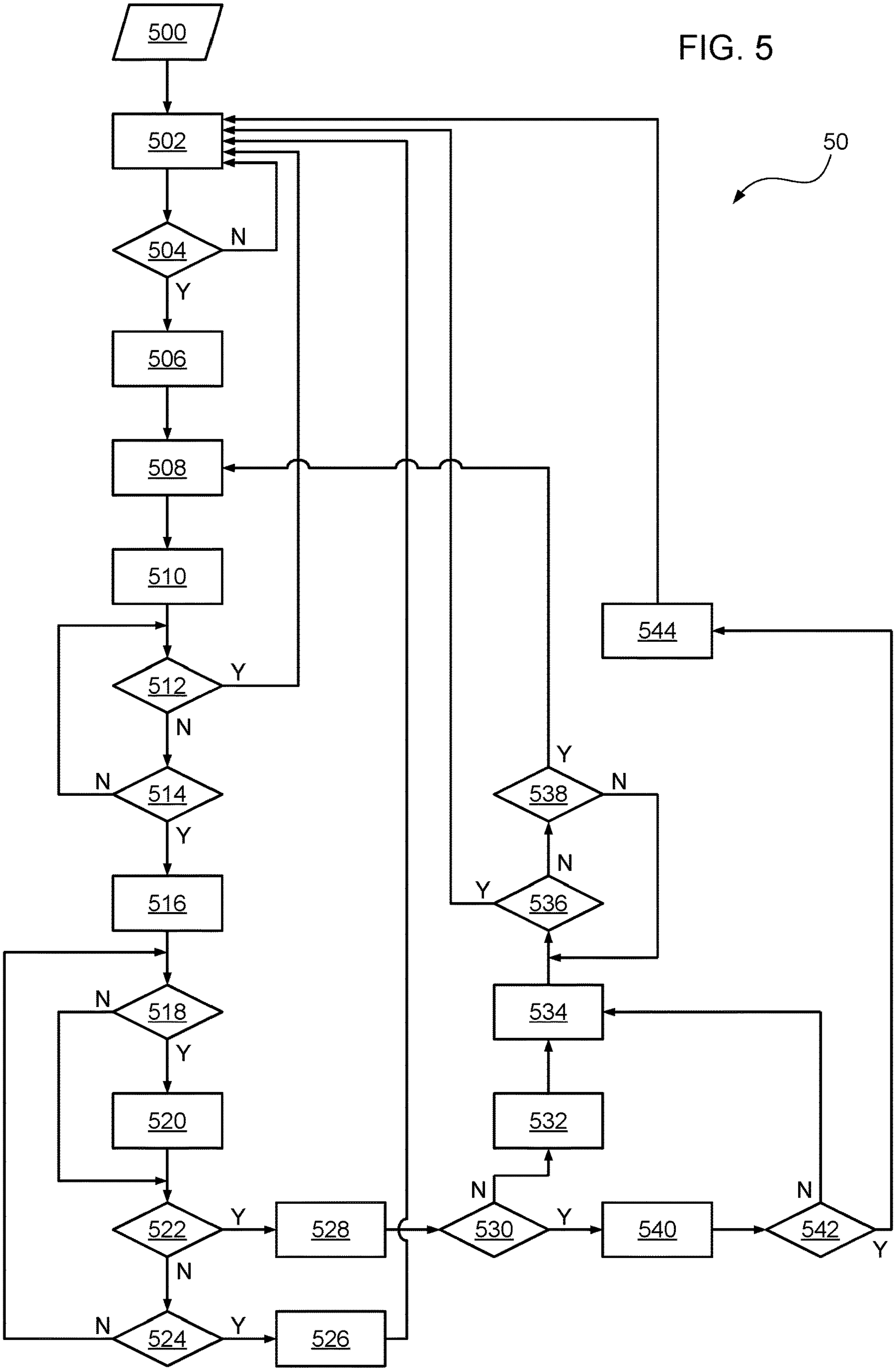
FIG. 5 is a flow diagram of an embodiment method for a diagnosis procedure implemented in a control system for lighting loads.

FIG. 5 is a flow diagram exemplary of possible steps of a diagnosis procedure 50 as included in one or more embodiments.

An initialization step 500 may comprise defining variables for carrying out the diagnosis procedure. As known in the art, a PWM supply signal may be characterized by an "on" time $T_{on}$ and an "off" time $T_{off}$, the sum of the on time and off time being equal to the duration of the PWM period $T_{per}$. The period duration $T_{per}$ can be fixed or programmable (e.g., equal to 10 ms). The duration $T_{on}$ of the on time may be variable, e.g., because it is defined as a function of the compensation algorithm run by the processing circuit 21. In addition, a blanking time $T_{blanking}$ may be defined. The blanking time $T_{blanking}$ may be an initial portion of each cycle of the PWM supply signal during which the overcurrent events are not detected.

For instance, the blanking time $T_{blanking}$ may be equal to 40 μs. Generally, the duration $T_{on}$ of the on time is higher than the blanking time $T_{blanking}$. In addition, a maximum number $N_{max}$ of "on" pulses of the PWM supply signal during which the overcurrent events are detected to be validated, may be defined. For instance, $N_{max}$ may be equal to 5. In addition, an overcurrent detection blanking time $T_{OC\_blanking}$ may be defined. The overcurrent detection blanking time $T_{OC\_blanking}$ may define the minimum time duration of an overcurrent condition within the current "on" time $T_{on}$ to be counted as an overcurrent event.

Therefore, in one or more embodiments, the initialization step 500 may comprise defining the following variables a pulse counter N (signed, ranging from −1 to $N_{max+1}$, an overcurrent bit OC, an overcurrent event bit $OC_{event}$, an overcurrent counter $T_{OC}$, a blanking time counter $T_{blanking}$, and a PWM pulse counter $T_{ON}$.

As exemplified in FIG. 5, a subsequent portion of the diagnosis procedure 50 may comprise steps 502 to 514 for the generation of the blanking time. Step 502 may include setting the PWM supply signal to a low value (e.g., zero), disabling the overcurrent detection, stopping and resetting any counter. Step 504 may comprise checking whether the PWM supply signal has to be turned on, and whether the overcurrent flag is cleared.

In the case of a negative outcome (N) of step 504, the procedure may return to step 502. In the case of a positive outcome (Y) of step 504, the procedure may continue to step 506. Step 506 may comprise setting the pulse counter N to zero. Step 508 may comprise setting the overcurrent bit OC to zero, and setting the PWM supply signal to a high value (e.g., one). Step 510 may comprise starting the blanking time counter $T_{blanking}$ and the PWM pulse counter $T_{ON}$. Step 512 may comprise checking whether the PWM supply signal is turned off by the microcontroller 102.

In the case of a positive outcome (Y) of step 512, the procedure may return to step 502. In the case of a negative outcome (N) of step 512, the procedure may continue to step 514. Step 514 may comprise checking whether the blanking time is elapsed (e.g., whether the blanking time counter has reached a threshold). In the case of a negative outcome (N) of step 514, the procedure may return to step 512. In the case of a positive outcome (Y) of step 514, the procedure may continue to step 516.

Step 516 starts a subsequent portion of the diagnosis procedure 50, including steps 516 to 528 for the detection and management of overcurrent events. Step 516 may include setting the overcurrent event bit $OC_{event}$ to zero, resetting the overcurrent counter $T_{OC}$, and enabling the overcurrent detection with a blanking time equal to $T_{OC\_blanking}$. Subsequent steps 518 to 524 may be carried out concurrently with steps 600 to 610 of an overcurrent detection procedure 60, as exemplified in FIG. 6.

In particular, the overcurrent detection procedure may include step 600, which includes checking whether overcurrent detection is enabled.

In the case of a negative outcome (N) of step 600, the procedure may return to step 600.

In the case of a positive outcome (Y) of step 600, the procedure may continue to step 602. Step 602 may include checking whether the current supplied to the I/O pin 101C exceeds a threshold value.

In the case of a negative outcome (N) of step 602, the procedure may continue to step 604. In the case of a positive outcome (Y) of step 602, the procedure may continue to step 606. Step 604 may include setting the overcurrent counter $T_{OC}$ to zero. Step 606 may include setting the overcurrent counter $T_{OC}$ to the minimum of the blanking time $T_{OC\_blanking}$ and the current value of the overcurrent counter $T_{OC}$ increased by one circuit (i.e., $T_{OC}$=min($T_{OC\_blanking}$; $T_{OC+1}$)). Step 608 may include checking whether the current value of the overcurrent counter $T_{OC}$ is higher than or equal to the blanking time $T_{OC\_blanking}$.

In the case of a negative outcome (N) of step 608, the procedure may return to step 600. In the case of a positive outcome (Y) of step 608, the procedure may continue to step 610. Step 610 may include setting the overcurrent event bit $OC_{event}$ to one.

Figure 6:
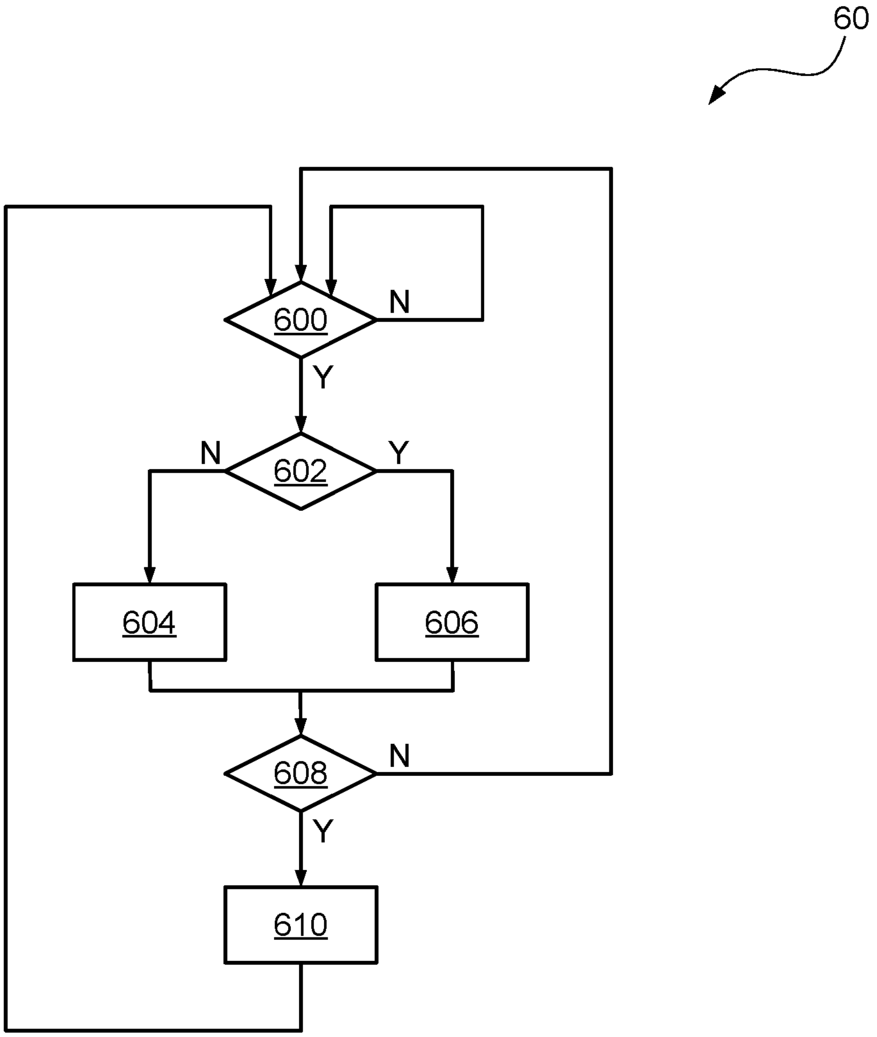
FIG. 6 is a flow diagram of an embodiment method for an overcurrent event management procedure implemented in a control system for lighting loads.

Concurrently with an overcurrent detection procedure 60 as exemplified in FIG. 6, steps 518 to 524 may be carried out. Step 518 may include checking whether the overcurrent event bit $OC_{event}$ is equal to one.

In the case of a positive outcome (Y) of step 518, the procedure may continue to step 520.

In the case of a negative outcome (N) of step 518, the procedure may continue to step 522. Step 520 may include setting the overcurrent bit OC to one. Step 522 may include checking whether the "on" time $T_{on}$ of the PWM supply signal is elapsed (e.g., whether the PWM pulse counter $T_{ON}$ has reached a threshold).

In the case of a negative outcome (N) of step 522, the procedure may continue to step 524. In the case of a positive outcome (Y) of step 522, the procedure may continue to step 528. Step 524 may include checking whether the PWM supply signal is turned off by the microcontroller 102.

In the case of a negative outcome (N) of step 524, the procedure may return to step 518. In the case of a positive outcome (Y) of step 524, the procedure may continue to step 526. Step 526 may include disabling the overcurrent detection. After step 526, the procedure may return to step 502. Step 528 may include disabling the overcurrent detection. After step 528, the procedure may continue to step 530.

Step 530 starts a subsequent portion of the diagnosis procedure 50 comprising steps 530 to 544 for generating the "off" time of the PWM supply signal, and checking the occurrence of a validated overcurrent event, upon which the driver element may be turned off. Step 530 may include checking whether the overcurrent bit OC is equal to one.

In the case of a negative outcome (N) of step 530, the procedure may continue to step 532. In the case of a positive outcome (Y) of step 530, the procedure may continue to step 540. Step 532 may include setting the pulse counter N to the maximum of zero, and the current value of the pulse counter N decreased by one circuit (i.e., N=max(0; N−1)). Step 534 may include setting the PWM supply signal to a low value (e.g., zero) and starting the PWM off counter $T_{OFF}$. Step 536 may include checking whether the PWM supply signal is turned off by the microcontroller 102. In the case of a positive outcome (Y) of step 536, the procedure may return to step 502.

In the case of a negative outcome (N) of step 536, the procedure may continue to step 538. Step 538 may include checking whether the "off" time $T_{off}$ of the PWM supply signal is elapsed (e.g., whether the PWM off counter $T_{OFF}$ has reached a threshold).

In the case of a negative outcome (N) of step 538, the procedure may return to step 536. In the case of a positive outcome (Y) of step 538, the procedure may return to step 508. Step 540 may include setting the pulse counter N to the minimum of $N_{max}$, and the current value of the pulse counter N increased by one circuit (i.e., N=min($N_{max}$; N+1)). Step 542 may include checking whether the current value of the pulse counter N is equal to or higher than the number $N_{max}$.

In the case of a negative outcome (N) of step 542, the procedure may return to step 534. In the case of a positive outcome (Y) of step 542, the procedure may continue to step 544. Step 544 may include reporting the value of the overcurrent bit OC and turning off the PWM supply signal (e.g., turning off the driver element).

Therefore, one or more embodiments may provide a system and a method for driving lighting loads (e.g., LED groups) with a flexible and programmable brightness compensation architecture, also in the case of plural lighting loads coupled in parallel to the same PWM supply pin.

One or more embodiments may thus provide one or more of the following advantages: each lighting load (e.g., single LED or LED group) can be driven (e.g., programmed) at its own brightness level, while the duty-cycle of the respective PWM supply voltage can still be compensated by the driver circuit 101 against variations of the battery voltage $V_{BAT}$, in the case of multiple lighting loads coupled in parallel, the respective duty-cycle values and dimming ramps can be managed independently by the microcontroller 102, while the more time-critical task (e.g., supply voltage compensation) is carried out by the driver circuit 101 (e.g., implemented as an ASSP), a number of lighting loads higher than the number of output stages (e.g., the number of high-side driver elements 30) of the driver circuit 101 can be compensated in real time, without resorting to direct drive inputs (e.g., PWM input signals which are directly driving the high side); established solutions for compensating variations of the battery voltage $V_{BAT}$ can be scaled up to a higher number of lighting loads without the need of re-designing the driver circuit 101, insofar as the brightness control is achieved by means of external circuitry controlled by the system microcontroller 102, possibly removing any limitation to the number of lighting loads couplable to the driver circuit 101, a high number of lighting loads can be independently dimmed or set to a different brightness level by means of external circuitry controlled by the system microcontroller 102, while the duty-cycle compensation can still implemented in the driver circuit 101, a diagnosis procedure for protecting the system (e.g., against short circuits or overcurrent events) is carried out in the driver circuit considering the arrangement of plural lighting loads coupled in parallel.

As exemplified herein, a system (e.g., 100') may include a microcontroller circuit (e.g., 102), a driver circuit (e.g., 101) coupled (e.g., 105) to the microcontroller circuit to receive data therefrom, and comprising a plurality of output supply pins (e.g., 101$C_1$, . . . , 101$C_n$), a plurality of lighting devices (e.g., $\mathbf{31}_{1,1}$, . . . , $\mathbf{31}_{1,m}$, $\mathbf{31}_n$) coupled to the plurality of output supply pins, wherein the plurality of lighting devices includes at least one subset of lighting devices coupled to a same output supply pin in the plurality of output supply pins, and a set of respective electronic switches coupled in series to the lighting devices in the at least one subset of lighting devices.

As exemplified herein, the driver circuit may be configured to selectively propagate (e.g., $\mathbf{30}_1$, . . . , $\mathbf{30}_n$) a supply voltage (e.g., $V_{BAT}$) to the output supply pins to provide respective pulse-width modulated supply signals (e.g., $V_{BAT,1}$, . . . , $V_{BAT,n}$) at the output supply pins, and to compute respective duty-cycle values of the pulse-width modulated supply signals as a function of the data received from the microcontroller circuit. The microcontroller circuit may be configured to individually control the electronic switches via respective control signals (e.g., $P_{1,1}$, . . . , $P_{1,m}$) to individually adjust the brightness of the lighting devices in the at least one subset of lighting devices).

As exemplified herein, the lighting devices may include one or more light-emitting diodes.

As exemplified herein, the driver circuit may be configured to sense a value (e.g., $V_S$) of the supply voltage and may be configured to compute the respective duty-cycle values of the pulse-width modulated supply signals as a function of the sensed value of the supply voltage.

As exemplified herein, the control signals may be pulse-width modulated control signals having a frequency higher than the frequency of the pulse-width modulated supply signals, optionally having a frequency 10 to 20 times higher than the frequency of the pulse-width modulated supply signals.

As exemplified herein, the respective electronic switches coupled in series to the lighting devices in the at least one subset of lighting devices may include respective first transistors (e.g., $T\mathbf{2}_{1,1}$, . . . , $T\mathbf{2}_{1,m}$) having respective control terminals controlled by the respective control signals.

As exemplified herein, the signal propagation network for each of the control signals from the microcontroller circuit to the respective first transistor may include a control node (e.g., $\mathbf{40}_{1,1}$, . . . , $\mathbf{40}_{1,m}$) configured to receive the respective control signal from the microcontroller circuit, and a current path coupled between the respective output supply pin of the driver circuit and ground, the current path comprising a series arrangement of a first resistor (e.g., $R\mathbf{1}_{1,1}$, . . . , $R\mathbf{1}_{1,m}$), a second resistor (e.g., $R\mathbf{2}_{1,1}$, . . . , $R\mathbf{2}_{1,m}$) and a further transistor (e.g., $T\mathbf{1}_{1,1}$, . . . , $T\mathbf{1}_{1,m}$).

As exemplified herein, a control terminal of the further transistor may be coupled (e.g., $R\mathbf{4}_{1,1}$, . . . , $R\mathbf{4}_{1,m}$) to the control node, and the control terminal of the first transistor may be coupled to a node intermediate the first resistor and the second resistor.

As exemplified herein, the driver circuit may be configured to measure, during ON times of the pulse-width modulated supply signals, a current supplied to the output supply pins, check whether the current supplied to the output supply pins is higher than an overcurrent threshold value, and detect an overcurrent event in response to the current supplied to the output supply pins being higher than the overcurrent threshold value.

As exemplified herein, the driver circuit may be configured to measure a blanking time period elapsing since the start of an ON time of the pulse-width modulated supply signals, and measure the current supplied to the output supply pins as a result of the measured blanking time period reaching a blanking threshold value.

As exemplified herein, the driver circuit may be configured to check whether the current supplied to the output supply pins is higher than the overcurrent threshold value over the duration of a measurement time period and detect an overcurrent event in response to the current supplied to the output supply pins being higher than the overcurrent threshold value over the duration of the measurement time period.

As exemplified herein, the driver circuit may be configured to detect an overcurrent event in response to the current supplied to the output supply pins being higher than the overcurrent threshold value during a plurality of subsequent ON times of the pulse-width modulated supply signals.

As exemplified herein, a method may include generating a plurality of pulse-width modulated supply signals for supplying a plurality of lighting devices, providing the same pulse-width modulated supply signal of the plurality of pulse-width modulated supply signals to at least one subset of lighting devices of the plurality of lighting devices, generating respective control signals for each lighting device in the subset of lighting devices supplied by the same pulse-width modulated supply signal, and individually coupling and decoupling each lighting device in the subset of lighting devices from the same pulse-width modulated supply signal, as a function of the respective control signal, to individually adjust a brightness of the lighting devices in the at least one subset of lighting devices.

As exemplified herein, a method may include measuring, during ON times of the pulse-width modulated supply signals, a current supplied to the lighting devices, checking whether the current supplied to the lighting devices is higher than an overcurrent threshold value, and detecting an overcurrent event in response to the current supplied to the lighting devices being higher than the overcurrent threshold value.

Without prejudice to the underlying principles, the details and embodiments may vary, even significantly, with respect to what has been described by way of example only, without departing from the extent of protection.

It is understood that the embodiments of this disclosure are not limited to applications disclosed herein regarding the measurement of a voltage drop at a reserve capacitor in a supplemental restraint system. The various embodiments are also applicable to other applications that benefit from measuring a voltage drop at a terminal of an electronic circuit having an unknown baseline voltage.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A system, comprising:

a microcontroller;

a driver circuit coupled to the microcontroller, the driver circuit comprising a plurality of output supply pins, the driver circuit configured to:

receive data from the microcontroller, selectively propagate a supply voltage to the output supply pins to transmit a pulse-width modulated supply signal at a corresponding output supply pin, and compute a duty-cycle value of the pulse-width modulated supply signal at the corresponding output supply pin as a function of the data received from the microcontroller;

a plurality of lighting devices coupled to the plurality of output supply pins, wherein a subset of lighting devices is coupled to a same output supply pin of the plurality of output supply pins; and electronic switches coupled in series to the subset of lighting devices, wherein the microcontroller is configured to individually control each of the electronic switches via a corresponding control signal to individually adjust a brightness of the subset of lighting devices.

2. The system of claim 1, wherein the plurality of lighting devices comprise a light-emitting diode.

3. The system of claim 1, wherein the driver circuit is configured to:

sense a value of the supply voltage; and compute a second duty-cycle value of the pulse-width modulated supply signal at the corresponding output supply pin as a function of the value of the supply voltage.

4. The system of claim 1, wherein each control signal is a pulse-width modulated control signal having a frequency higher than the frequency of the pulse-width modulated supply signal.

5. The system of claim 4, wherein a frequency of each control signal is between 10 and 20 times greater than the frequency of the pulse-width modulated supply signal.

6. The system of claim 1, wherein each electronic switch includes a first transistor having respective control terminals controlled by the corresponding control signal.

7. The system of claim 6, wherein a signal propagation network for each control signal to a corresponding first transistor comprises:

a control node configured to receive the corresponding control signal from the microcontroller; and a current path coupled between the corresponding output supply pin and ground, the current path comprising a series arrangement of a first resistor, a second resistor, and a second transistor, wherein a control terminal of the second transistor is coupled to the control node of the second transistor, and wherein the control terminal of the first transistor is coupled to a node intermediate to the first resistor and the second resistor.

8. The system of claim 1, wherein the driver circuit is configured to:

measure a value of a current supplied to the corresponding output supply pin during ON times of the pulse-width modulated supply signal;

determine whether the value of the current is greater than an overcurrent threshold value; and detect an overcurrent event in response to the value of the current supplied to the corresponding output supply pin being greater than the overcurrent threshold value.

9. The system of claim 8, wherein the driver circuit is configured to:

measure a blanking time period from a start of an ON time of the pulse-width modulated supply signal at the corresponding output supply pin; and measure a value of the current supplied to the corresponding output supply pin as a result of the blanking time period reaching a blanking threshold value.

10. The system of claim 8, wherein the driver circuit is configured to:

determine whether a value of the current supplied to the corresponding output supply pin is greater than the overcurrent threshold value over a duration of a measurement time period; and detect an overcurrent event in response to the current supplied to the corresponding output supply pin being greater than the overcurrent threshold value over the duration of the measurement time period.

11. The system of claim 8, wherein the driver circuit is configured to detect an overcurrent event in response to a value of the current supplied to the corresponding output supply pin being greater than the overcurrent threshold value during a plurality of subsequent ON times of the pulse-width modulated supply signal the corresponding output supply pin.

12. A method, comprising:

generating a pulse-width modulated supply signal;

transmitting the pulse-width modulated supply signal to a subset of lighting devices of a plurality of lighting devices, each lighting device in the subset of lighting devices receiving the same pulse-width modulated supply signal;

generating a control signal for each lighting device in the subset of lighting devices, the control signal for each lighting device being independently controlled with respect to the pulse-width modulated supply signal; and individually coupling and decoupling each lighting device in the subset of lighting devices from the pulse-width modulated supply signal as a function of the control signal to individually adjust a brightness of each lighting device in the subset of lighting devices.

13. The method of claim 12, further comprising:

measuring a value of a current supplied to the lighting devices during ON times of the pulse-width modulated supply signal; and determining whether the value of the current is greater than an overcurrent threshold value; and detecting an overcurrent event in response to the value of the current being greater than the overcurrent threshold value.

14. The method of claim 12, wherein the plurality of lighting devices comprise a light-emitting diode.

15. A method of operating a device, comprising:

receiving, by a driver circuit, data from a microcontroller, the driver circuit comprising a plurality of output supply pins selectively propagating a supply voltage to the output supply pins to transmit a pulse-width modulated supply signal at a corresponding output supply pin;

computing a duty-cycle value of the pulse-width modulated supply signal at the corresponding output supply pin as a function of the data received from the microcontroller; and individually controlling, by the microcontroller, electronic switches via a corresponding control signal to individually adjust a brightness of a subset of lighting devices, the device comprising a plurality of lighting devices coupled to the plurality of output supply pins, wherein the subset of lighting devices is coupled to a same output supply pin of the plurality of output supply pins, the electronic switches coupled in series to the subset of lighting devices.

16. The method of claim 15, further comprising:

sensing, by the driver circuit, a value of the supply voltage; and computing, by the driver circuit, a second duty-cycle value of the pulse-width modulated supply signal at the corresponding output supply pin as a function of the value of the supply voltage.

17. The method of claim 15, wherein each control signal is a pulse-width modulated control signal having a frequency higher than the frequency of the pulse-width modulated supply signal.

18. The method of claim 17, wherein a frequency of each control signal is between 10 and 20 times greater than the frequency of the pulse-width modulated supply signal.

19. The method of claim 15, further comprising:

measuring, by the driver circuit, a value of a current supplied to the corresponding output supply pin during ON times of the pulse-width modulated supply signal;

determining, by the driver circuit, whether the value of the current is greater than an overcurrent threshold value; and detecting, by the driver circuit, an overcurrent event in response to the value of the current supplied to the corresponding output supply pin being greater than the overcurrent threshold value.

20. The method of claim 19, further comprising:

measuring, by the driver circuit, a blanking time period from a start of an ON time of the pulse-width modulated supply signal at the corresponding output supply pin; and measuring, by the driver circuit, a value of the current supplied to the corresponding output supply pin as a result of the measured blanking time period reaching a blanking threshold value.

* * * * *